(12) United States Patent
Matsuda

(10) Patent No.: US 8,830,544 B2
(45) Date of Patent: Sep. 9, 2014

(54) IMAGE READING APPARATUS

(75) Inventor: Yasuhiro Matsuda, Ishikawa (JP)

(73) Assignee: PFU Limited, Ishikawa (JP)

( * ) Notice: Subject to any disclaimer, the term of this patent is extended or adjusted under 35 U.S.C. 154(b) by 804 days.

(21) Appl. No.: 13/048,601

(22) Filed: Mar. 15, 2011

(65) Prior Publication Data

US 2011/0292475 A1 Dec. 1, 2011

(30) Foreign Application Priority Data

Jun. 1, 2010 (JP) ................................. 2010-126119

(51) Int. Cl.
- *H04N 1/04* (2006.01)
- *H04N 1/12* (2006.01)
- *H04N 1/193* (2006.01)

(52) U.S. Cl.
CPC .............. *H04N 1/1215* (2013.01); *H04N 1/193* (2013.01); *H04N 2201/0446* (2013.01); *H04N 2201/0081* (2013.01)
USPC ............................ 358/498; 358/474; 358/497

(58) Field of Classification Search
USPC .................. 358/474, 498, 408, 486, 494, 497
See application file for complete search history.

(56) References Cited

U.S. PATENT DOCUMENTS

| | | | |
|---|---|---|---|
| 5,469,197 A | 11/1995 | Hiramatsu | |
| 5,724,159 A * | 3/1998 | Nakagawa et al. | 358/474 |
| 7,916,357 B2 * | 3/2011 | Sugiyama et al. | 358/474 |
| 8,199,382 B2 * | 6/2012 | Osakabe | 358/497 |
| 8,356,814 B2 * | 1/2013 | Inoue | 271/274 |
| 2005/0046912 A1 * | 3/2005 | Nobe et al. | 358/498 |
| 2005/0254103 A1 | 11/2005 | Sugiyama et al. | |
| 2007/0253728 A1 * | 11/2007 | Yamazaki | 399/110 |
| 2009/0243199 A1 * | 10/2009 | Daigo et al. | 271/225 |

FOREIGN PATENT DOCUMENTS

| | | |
|---|---|---|
| CN | 1027243 C | 1/1995 |
| JP | 10-190938 | 7/1998 |
| JP | 2000-255827 | 9/2000 |
| JP | 2001-524281 A | 11/2001 |
| JP | 2002-296690 A | 10/2002 |
| JP | 2004-297760 | 10/2004 |
| JP | 4311660 | 5/2009 |
| WO | 98/44720 A1 | 10/1998 |

OTHER PUBLICATIONS

Chinese Office Action issued in Chinese Application No. 201110087578.1 mailed May 24, 2013.
Japanese Notice of Rejection, w/ English translation thereof, issued in Japanese Patent Application No. JP 2010-126119 dated Jan. 14, 2014.
Chinese Office Action issued in Chinese Patent Application No. CN 201110087578.1 dated Jan. 3, 2014.

* cited by examiner

*Primary Examiner* — Allen H Nguyen
(74) *Attorney, Agent, or Firm* — McDermott Will & Emery LLP

(57) ABSTRACT

An image reading apparatus includes an image reader unit that has a plurality of light receiving elements for reading an image on an original, and moves relative to a frame for applying a pressing force to a read-target surface of the original; and a driven roller that is rotatable, comes into contact with the original, and moves relative to the frame and independent of the image reader unit in a direction in which the image reader unit applies the pressing force to the original, thereby applying a pressing force to the original independent of the image reader unit.

6 Claims, 7 Drawing Sheets

IMAGE READING APPARATUS

CROSS-REFERENCE TO RELATED APPLICATIONS

This application is based upon and claims the benefit of priority from Japanese Patent Application No. 2010-126119, filed on Jun. 1, 2010, the entire contents of which are incorporated herein by reference.

BACKGROUND OF THE INVENTION

1. Field of the Invention

The present invention relates to an image reading apparatus.

2. Description of the Related Art

Image reading apparatuses for reading images on to-be-read-media, such as originals, receive light reflected from the to-be-read-media and convert the reflected light into an electrical signal by using light receiving elements in order to electrically process the images on the to-be-read media. Some conventional image reading apparatuses read images by using what is called a line sensor, which is a relatively low-cost image reading unit having light receiving elements arranged in a one-dimensional direction, or include a mechanism for conveying a to-be-read-medium at the time of image reading in order to improve read operability. Some of the image reading apparatuses having the mechanism for conveying a to-be-read-medium convey a to-be-read-medium while applying a pressing force to the to-be-read-medium in order to convey the to-be-read-medium more appropriately.

For example, a plate-like-medium conveying apparatus disclosed in Japanese Patent Application laid-open No. 2000-255827 includes a rotatable roller arm that supports a driven roller, and a torsion spring that is mounted on a support shaft of the roller arm. In this structure, a force in the rotational direction about the support shaft is generated on the roller arm due to the elastic force of the torsion spring, and the driven roller applies a pressing force to a to-be-read-medium according to the force in the rotational direction.

An image reading apparatus disclosed in Japanese Patent No. 4311660 includes roller pairs arranged on the upstream and downstream sides of an image reading unit. In each roller pair, a driven roller is biased toward a driving roller by a compression spring. The image reading unit is biased by a compression spring in a direction that the width of a gap between the image reading unit and images to be read is narrowed. The image reading unit includes bearing units for bearing roller shafts of the driven rollers. Therefore, when a sheet medium carrying an image to be read enters between the driven roller and the driving roller and then the driven roller is separated from the driving roller, the force is transmitted to the bearing unit and the image reading unit moves in the same direction.

An image reading apparatus disclosed in Japanese Patent Application Laid-open No. H10-190938 is structured such that a read driven roller is press fitted to a read driving roller by a spring. At the time of reading an original, the original is caused to pass between the read driven roller and the read driving roller and a pressing force is applied to the original by the read driven roller. Therefore, the original comes into close contact with a transparent glass of a back-side reading unit and a contact sensor reads image information on the original.

An image reading apparatus disclosed in Japanese Patent Application Laid-open No. 2004-297760 includes a pressing-force generation mechanism for pressing an original against an image sensor. The pressing-force generation mechanism includes a pressing member that rotates about a rotation axis while pressing an original against a glass surface of the image sensor. Therefore, when the image sensor reads image information on an original, the original is conveyed with a pressing force applied by the pressing member.

In the image reading apparatuses that read images with conveyance of to-be-read media, a roller applies a pressing force to the to-be-read-media during the conveyance as above in order to perform appropriate conveyance. In the case of use of a contact-type image reading unit that reads images by contact with the to-be-read-media, the image reading unit also applies a pressing force to the to-be-read-media during reading. In the image reading apparatuses that cause the image reading unit to apply a pressing force to to-be-read-media and read images while the image reading unit is in close contact with the to-be-read-media, because both of the image reading unit and the roller apply the pressing force to the to-be-read-media, the roller is generally mounted on the image reading unit.

In recent years, there is a demand for downsizing of image reading apparatuses in order to improve installability, operability, appearance, and the like. To meet this demand, each unit for conveying to-be-read-media is downsized. Therefore, the diameter of the roller is downsized similarly to the other units. However, if the diameter of the roller mounted on the image reading unit is downsized, the amount of protrusion of the roller with respect to the image reading unit is reduced, reducing stroke for applying a pressing force to to-be-read-media. In this case, the pressing force applied to the to-be-read-media is reduced and conveyance of the to-be-read-media may become unstable.

SUMMARY OF THE INVENTION

It is an object of the present invention to at least partially solve the problems in the conventional technology.

According to an aspect of the present invention, an image reading apparatus includes: an image reading unit that has a plurality of light receiving elements for reading an image on a to-be-read-medium, and moves relative to a frame for applying a first pressing force to a read-target surface of the to-be-read-medium, the read-target surface carrying an image to be read; and a pressing roller that is rotatable, comes into contact with the to-be-read-medium, and moves relative to the frame and independent of the image reading unit in the same direction in which the image reading unit applies the first pressing force to the to-be-read-medium, thereby applying a second pressing force to the to-be-read-medium independent of the image reading unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an image reading apparatus according to the present invention will be explained in detail below with reference to the accompanying drawings. The present invention is not limited to the embodiments. In addition, structural elements in the following embodiments include those easily replaceable by those skilled in the art, or those substantially the same.

Embodiment

Figure 1:
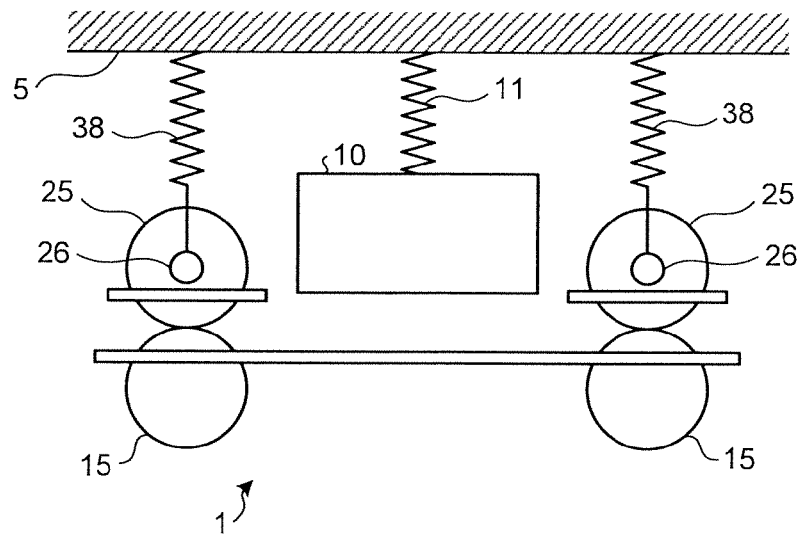
FIG. 1 is a schematic diagram of an image reading apparatus according to an embodiment.

FIG. 1 is a schematic diagram of an image reading apparatus according to an embodiment. An image reading apparatus 1 depicted in FIG. 1 includes an image reader unit 10 having an image reader that has a plurality of light receiving elements and is capable of reading an image on an original that is a to-be-read-medium; a driving roller 15 that conveys an original by contact with the original when the image reader reads an image on the original; and a driven roller 25 that is disposed at a position opposite the driving roller 15 and rotates along with movement of an original when the driving roller 15 conveys the original. The image reader of the image reader unit 10 is what is called a CIS (Contact Image Sensor) that reads an image on an original by close contact with the original. Therefore, the image reader unit 10 is provided as a CIS unit. The driving roller 15 is connected to a motor (not depicted in the drawings) disposed inside the image reading apparatus 1 and rotates by electrically operating the motor.

The image reader unit 10 and the driven roller 25 are not directly connected to a frame 5, but are arranged so that they can move relative to the frame 5. More specifically, the image reader unit 10 is fixed to the frame 5, which functions as a casing of the image reading apparatus 1, via a reader spring 11 that is an elastic member. The image reader unit 10 can read an image on an original via a surface opposite the surface connected to the reader spring 11. That is, the surface opposite the surface connected to the reader spring 11 functions as an image read surface for reading an image on an original and also functions as a conveyance path for conveying the original.

The reader spring 11 disposed between the frame 5 and the image reader unit 10 and connected to both of the frame 5 and the image reader unit 10 is formed of a compression spring, and applies a biasing force to the image reader unit 10 in a direction in which the image reader unit 10 is separated from the frame 5. The image reader unit 10 is movable relative to the frame 5 while the biasing force is applied thereto by the reader spring 11.

The driven roller 25 forms a pair with the driving roller 15. The driven roller 25 is movable relative to the frame 5 as well as relative to the driving roller 15. The pair of the driving roller 15 and the driven roller 25 is arranged on each of the upstream and downstream sides of the image reader unit 10 in an original conveyance direction. The driving roller 15 and the driven roller 25 as a pair are disposed opposite each other, and the pair is disposed at each of the upstream and downstream sides of the image reader unit 10.

A rotation axis 26 that is an axis of rotation of the driven roller 25 is disposed so as to be oriented perpendicular to the original conveyance direction. The driven roller 25 is connected to the frame 5, to which the image reader unit 10 is connected, via a roller spring 38 that is an elastic member. The roller spring 38 is formed of a compression spring similarly to the reader spring 11, and applies a biasing force to the driven roller 25 in a direction in which the driven roller 25 is separated from the frame 5. The driven roller 25 is movable relative to the frame 5 and relative to the driving roller 15 while the biasing force is applied thereto by the roller spring 38.

Figure 2:
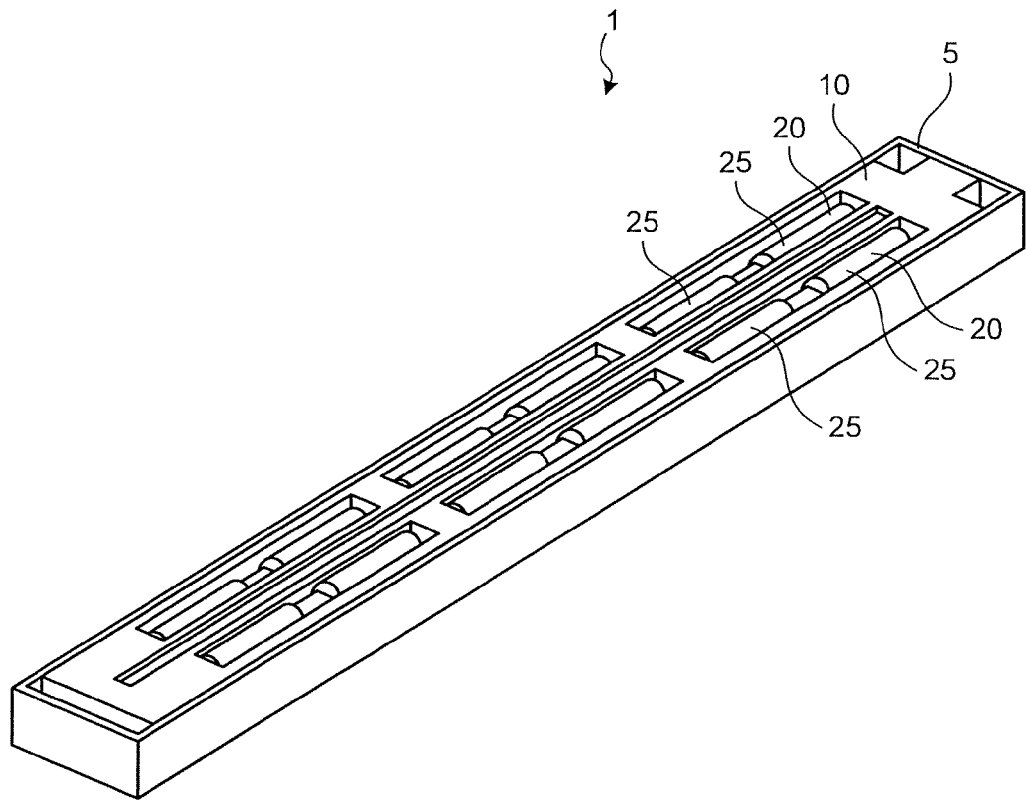
FIG. 2 is an explanatory diagram of an image reader unit and a driven roller depicted in FIG. 1, which are viewed from an image read surface side.
Figure 3:
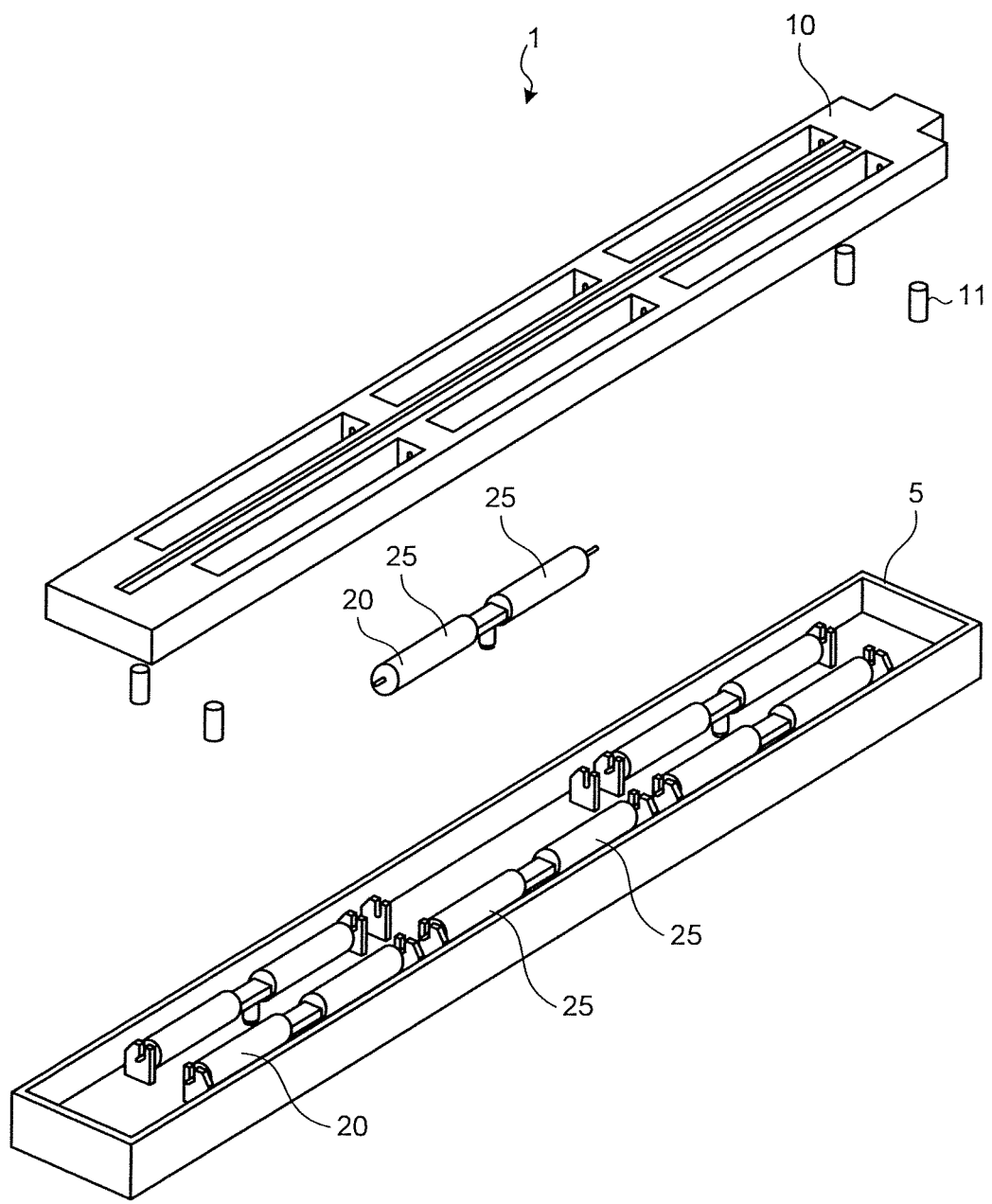
FIG. 3 is an explanatory diagram of the state in which the image reader unit depicted in FIG. 2 is detached from a frame.

FIG. 2 is an explanatory diagram of the image reader unit and the driven roller depicted in FIG. 1, which are viewed from the image read surface side. FIG. 3 is an explanatory diagram of the state in which the image reader unit depicted in FIG. 2 is detached from the frame. Two driven rollers 25 are integrated into one driven roller unit 20. A plurality of the driven roller units 20 are connected to the frame 5. The driven roller units 20 are disposed on both of the upstream and downstream sides of the image reader unit 10 so that the driven rollers 25 can be disposed on both of the upstream and downstream sides of the image reader unit 10 in the original conveyance direction. The plurality of the driven roller units 20 are disposed on the upstream and downstream sides of the image reader unit 10 such that the rotation axes 26 are oriented in the same direction on the upstream and downstream sides.

In the image reading apparatus 1 according to the present embodiment, three driven roller units 20 are arranged on each of the upstream and downstream sides of the image reader unit 10, i.e., a total of six driven roller units 20 are arranged. However, the number of the driven roller units 20 may be other than the above. The driven roller units 20 may be appropriately set depending on modes of the image reading apparatus 1, for example, the size of an original carrying an image that the image reading apparatus 1 is to read.

Figure 4:
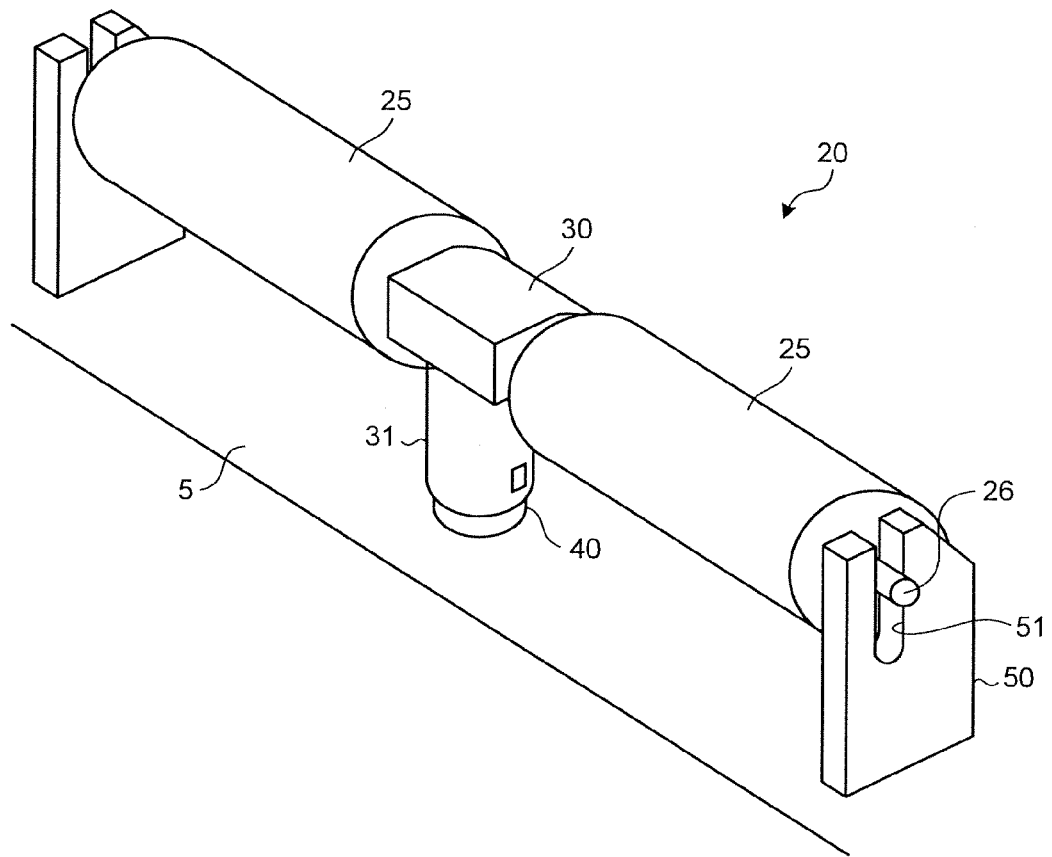
FIG. 4 is a detail view of the state in which a driven roller unit depicted in FIG. 3 is attached to the frame.

FIG. 4 is a detail view of the state in which the driven roller unit depicted in FIG. 3 is attached to the frame. Each driven roller unit 20 includes a bearing unit 30 for bearing the rotation axes 26 of the driven rollers 25 of the driven roller unit 20. Since two driven rollers 25 are provided in one driven roller unit 20, the rotation axes 26 are provided for the two respective driven rollers 25. More specifically, the rotation axes 26 extend in opposite directions from the bearing unit 30, and the driven rollers 25 are arranged such that the respective rotation axes 26 serve as axes of the driven rollers 25. Therefore, the driven rollers 25 are disposed on both sides across the bearing unit 30 similarly to the rotation axes 26.

The bearing unit 30 includes a sliding guide unit 31 that enables connection to the frame 5. The sliding guide unit 31 is in the form of an approximate cylinder, and the central axis of the cylinder is oriented perpendicular to the direction in which the rotation axes 26 are formed. The bearing unit 30 is connected to the frame 5 when the sliding guide unit 31 is engaged with a bearing boss 40 that is a roller supporting unit provided in the frame 5. That is, the driven roller unit 20 is connected to the frame 5 when the sliding guide unit 31 of the bearing unit 30 in the driven roller unit 20 is engaged with the bearing boss 40 and the sliding guide unit 31 is supported by the bearing boss 40.

The frame 5 includes axial-end guide units 50 that are axial-end guides for supporting the vicinities of the axial ends of the rotation axes 26. Since the rotation axes 26 extend in two respective directions, which are opposite directions from the bearing unit 30, the axial-end guide units 50 are disposed near the respective ends of the rotation axes 26 in the two directions.

Each of the axial-end guide units 50 arranged as above is in the form of a plate, and arranged on the frame 5 such that the thickness direction of the plate is oriented along the axial direction of the rotation axes 26. More specifically, the axial-end guide units 50 are arranged so as to protrude in the same direction as the direction in which the bearing boss 40 protrudes from the frame 5.

A guide groove 51, which is a groove into which the rotation axis 26 is inserted, is formed on each of the axial-end guide units 50. The guide groove 51 pierces through the axial-end guide unit 50 in the thickness direction, and is in the form of a groove, which is cut from an end of the axial-end guide unit 50 opposite the end connected to the frame 5 and which extends in a direction along the direction in which the axial-end guide units 50 and the bearing boss 40 protrude from the frame 5. That is, the guide groove 51 is formed as a groove of which one end opposite the end at which the axial-end guide unit 50 is connected to the frame 5 is opened.

An end of the rotation axis 26 protrudes from the driven roller 25, and this protruding portion is inserted into the guide groove 51 formed on the axial-end guide unit 50. Therefore, the rotation axis 26 is supported by the guide groove 51 and the axial-end guide unit 50.

Figure 5:
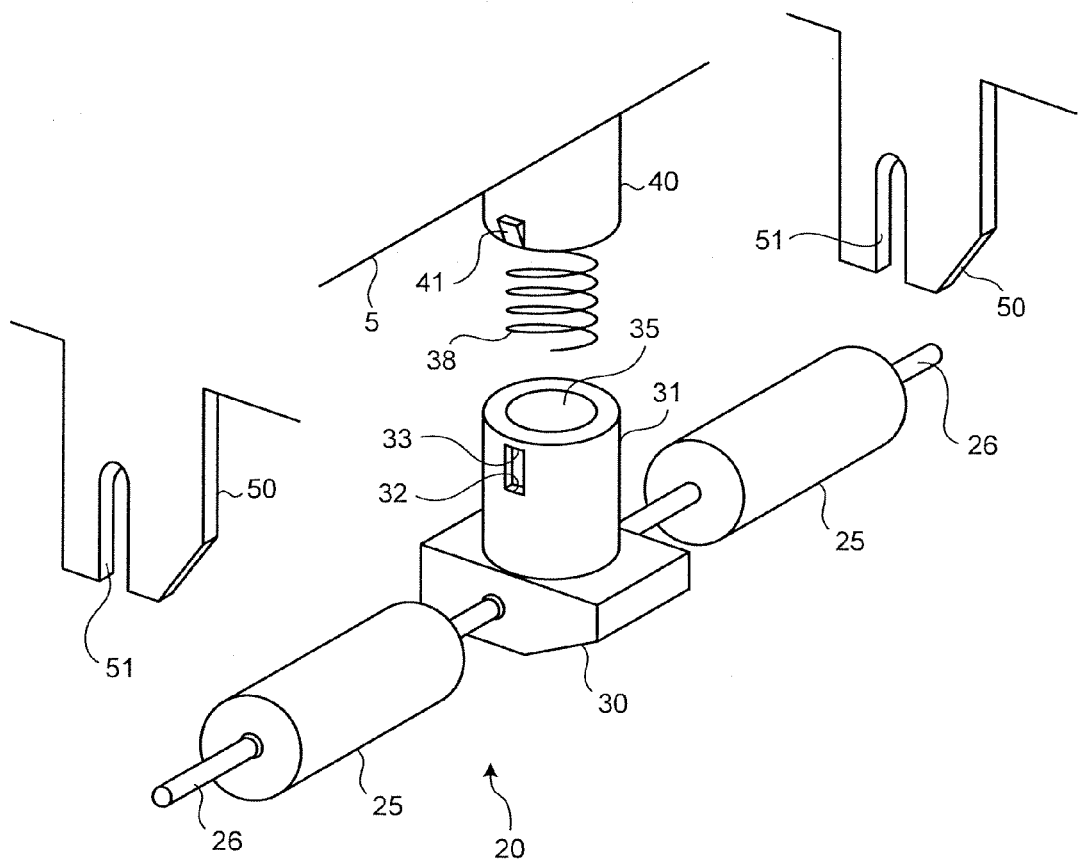
FIG. 5 is an explanatory diagram of the state in which the driven roller unit depicted in FIG. 4 is detached from the frame.

FIG. 5 is an explanatory diagram of the state in which the driven roller unit depicted in FIG. 4 is detached from the frame. The driven roller unit 20 is supported by the bearing boss 40 and the axial-end guide units 50 arranged on the frame 5. The roller spring 38 is disposed between the sliding guide unit 31, which is formed on the bearing unit 30 of the driven roller unit 20, and the bearing boss 40. More specifically, the bearing boss 40 is in the form of an approximate cylinder, of which outer diameter is slightly smaller than an inner diameter of the cylindrically-shaped sliding guide unit 31. The roller spring 38 can enter the inside of the cylindrically-shaped sliding guide unit 31. That is, the interior of the sliding guide unit 31 is formed as a spring holder 35 for holding the roller spring 38.

Protrusions 41 that protrude outward in a radial direction of the bearing boss 40 are formed on an outer wall of the bearing boss 40. The protrusions 41 are formed so as to protrude in a direction in which the rotation axes 26 of the driven roller unit 20 are formed. That is, two protrusions 41 are disposed at positions shifted by about 180° from each other on the outer wall of the cylindrically-shaped bearing boss 40.

Grooves 32, into which the protrusions 41 are inserted, are formed on the sliding guide unit 31 in accordance with the bearing boss 40 on which the protrusions 41 are formed as above. The grooves 32 are formed so as to extend in the axial direction of the cylindrically-shaped sliding guide unit 31, i.e., in the direction perpendicular to the rotation axes 26. An end of each of the grooves 32 on the bearing boss 40 side, or on the frame 5 side, in the axial direction of the cylindrically-shaped sliding guide unit 31 are blocked.

In order that the sliding guide unit 31 formed as above and the bearing boss 40 are engaged with each other, the roller spring 38 is inserted into the spring holder 35 of the sliding guide unit 31 and the bearing boss 40 is also inserted into the spring holder 35. Accordingly, the sliding guide unit 31 and the bearing boss 40 are engaged with each other with the roller spring 38 interposed therebetween.

Figure 6:
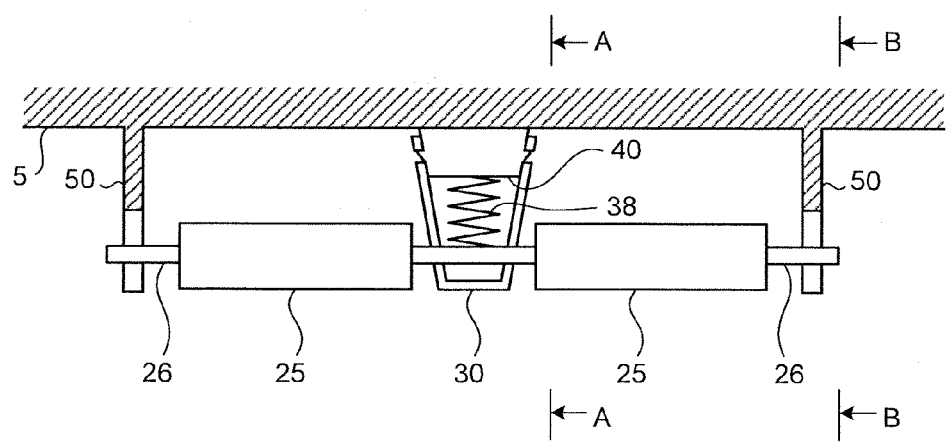
FIG. 6 is an explanatory diagram of the state in which the driven roller unit is connected to the frame.
Figure 7:
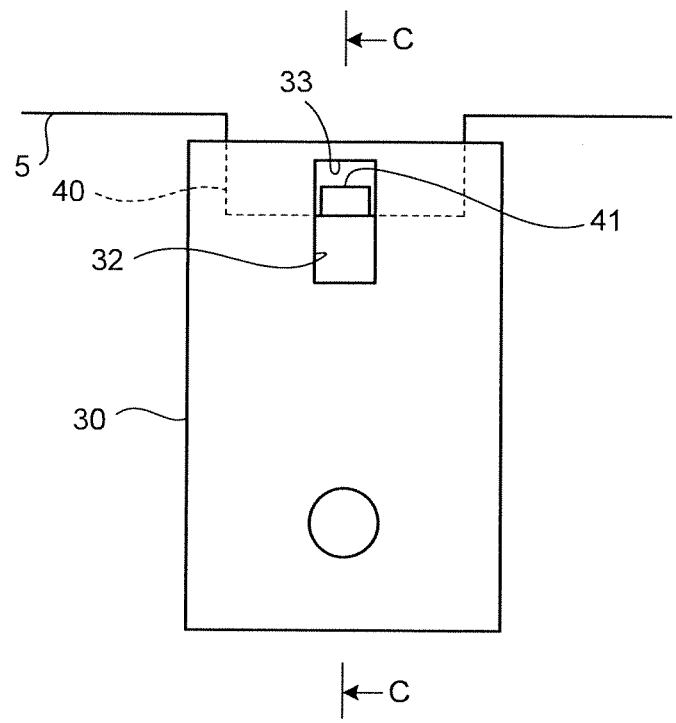
FIG. 7 is a view taken in the direction of arrows A-A shown in FIG. 6.
Figure 8:
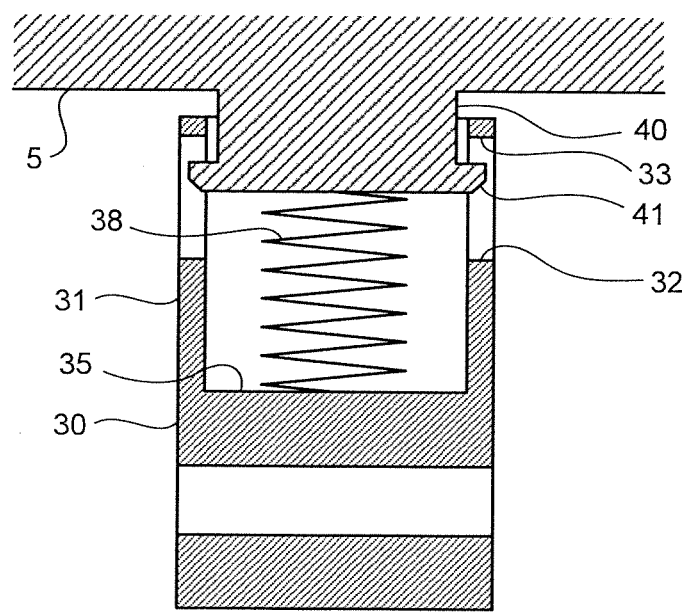
FIG. 8 is a cross-sectional view taken along line C-C shown in FIG. 7.

FIG. 6 is an explanatory diagram of the state in which the driven roller unit is fixed to the frame. FIG. 7 is a view taken in the direction of arrows A-A shown in FIG. 6. FIG. 8 is a cross-sectional view taken along line C-C shown in FIG. 7. For connecting the driven roller unit 20 and the frame 5, the sliding guide unit 31 of the bearing unit 30 and the bearing boss 40 are engaged with each other to establish the connection. In order that the sliding guide unit 31 and the bearing boss 40 are engaged with each other, the roller spring 38 is inserted into the spring holder 35 of the sliding guide unit 31. While the roller spring 38 is held by the spring holder 35, the bearing boss 40 is also inserted into the spring holder 35. Since the roller spring 38 is formed of a compression spring, the bearing boss 40 compresses the roller spring 38 when the bearing boss 40 is inserted into the spring holder 35. Therefore, the roller spring 38 comes into contact with both of the sliding guide unit 31 and the bearing boss 40 while applying a biasing force for separating the sliding guide unit 31 and the bearing boss 40 from each other. The sliding guide unit 31 and the bearing boss 40 are engaged with each other with the roller spring 38 interposed between the sliding guide unit 31 and the bearing boss 40 as above.

The grooves 32 are formed on the sliding guide unit 31 and the protrusions 41 are formed on the bearing boss 40. Both the grooves 32 and the protrusions 41 are formed at positions along the direction in which the rotation axes 26 are formed. Therefore, when the sliding guide unit 31 and the bearing boss 40 are engaged with each other, the protrusions 41 enter the grooves 32 from the spring holder 35 side. Further, the both ends of each groove 32 in the axial direction of the sliding guide unit 31 are blocked. Between the both ends, an end on the frame 5 side serves as a block portion 33 with which the protrusion 41 comes into contact.

Figure 9:
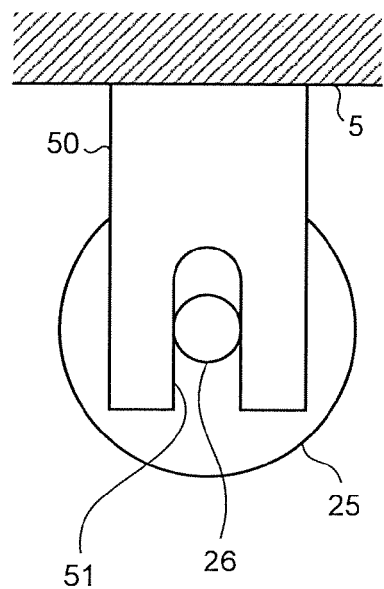
FIG. 9 is a view taken in the direction of arrows B-B depicted in FIG. 6.

FIG. 9 is a view taken in the direction of arrows B-B depicted in FIG. 6. When the sliding guide unit 31 and the bearing boss 40 are engaged with each other for connecting the driven roller unit 20 to the frame 5, the vicinity of the end of the rotation axis 26 of the driven roller unit 20 is supported by the axial-end guide unit 50. The guide groove 51 formed on the axial-end guide unit 50 has a groove width that is slightly larger than the diameter of the rotation axis 26, and the end side opposite the end at which the axial-end guide unit 50 is connected to the frame 5 is opened. Therefore, when the sliding guide unit 31 and the bearing boss 40 are engaged with each other, the rotation axis 26 enters the guide groove 51 from the opening of the guide groove 51. Accordingly, movement of the rotation axis 26 in the groove width direction of the guide groove 51 is regulated. Thus, the movement of the rotation axis 26 in a direction perpendicular to the direction in which the bearing boss 40 protrudes from the frame 5 is regulated by the sliding guide unit 31.

Figure 10:
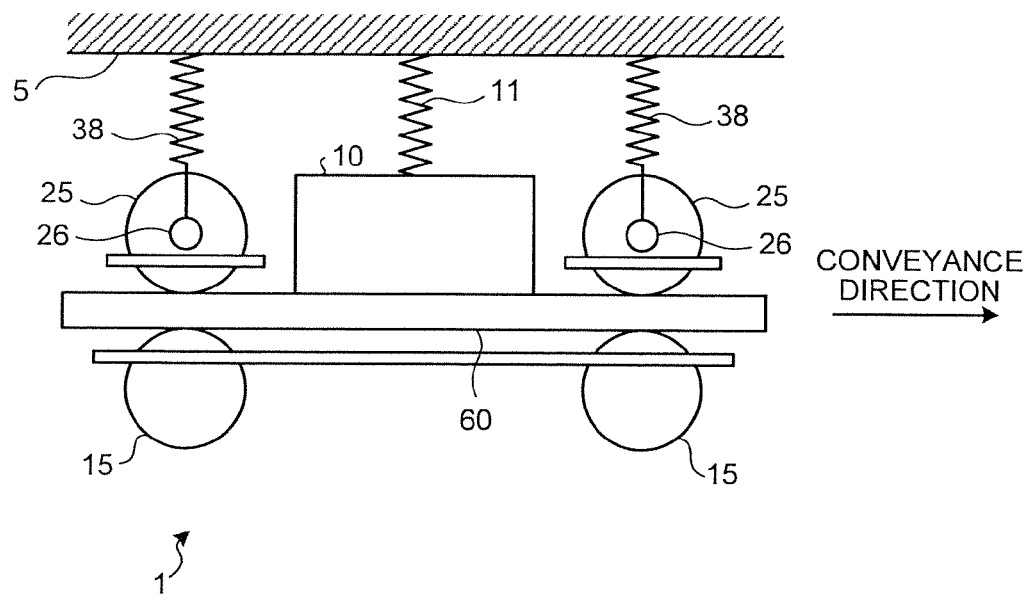
FIG. 10 is an explanatory diagram of the state of read of an image on an original.

The image reading apparatus 1 according to the embodiment has the above configuration. The operation of the image reading apparatus 1 will be described below. FIG. 10 is an explanatory diagram of the state of read of an image on an original. When the image reading apparatus 1 reads an image on an original 60 that is a to-be-read-medium, the original 60 is caused to enter between the driving roller 15 and the driven roller 25 on the upstream side of the image reader unit 10 in the conveyance direction for conveying the original 60 at the time of image reading. The driving roller 15 is arranged such that it can rotate by a motor provided in the image reading apparatus 1. When the original 60 enters between the driving roller 15 and the driven roller 25 on the upstream side of the image reader unit 10, the original 60 is conveyed toward the image reader unit 10 by the rotation of the driving roller 15.

At this time, a biasing force toward the driving roller 15 is applied to the driven roller 25 by the biasing force of the roller spring 38. That is, the driven roller 25 is biased such that the sliding guide unit 31 of the bearing unit 30 of the driven roller unit 20 is engaged with the bearing boss 40 in a relatively slidable manner, and the biasing force of the roller spring 38 is applied to both of the sliding guide unit 31 and the bearing boss 40 in directions in which the sliding guide unit 31 and the bearing boss 40 are separated from each other. Therefore, the biasing force of the roller spring 38 is applied to the driven roller unit 20 as a force in the direction in which the driven roller unit 20 is separated from the bearing boss 40, i.e., in the direction in which the driven roller unit 20 is separated from the frame 5.

The driven roller 25 is arranged in the driven roller unit 20 so as to rotate about the rotation axis 26 supported by the bearing unit 30. Therefore, the driven roller 25, which is arranged on the driven roller unit 20 and to which the biasing force of the roller spring 38 is applied as a force in a direction away from the frame 5, is pressed against the driving roller 15 due to the biasing force. In this state, when the original 60 enters between the driving roller 15 and the driven roller 25, the original 60 is conveyed toward the downstream side of the conveyance direction through the nip between the driving roller 15 and the driven roller 25 by the rotation of the driving roller 15 that is in contact with the original 60. In this case, the driven roller 25 that is in contact with the original 60 also rotates about the rotation axis 26 along with the movement of the original 60 in the conveyance direction.

The biasing force toward the driving roller 15 is applied to the driven roller 25 by the biasing force of the roller spring 38, and the driven roller unit 20 having the driven roller 25 is connected to the frame 5 while the sliding guide unit 31 and the bearing boss 40 are slidably connected to each other. Therefore, when the original 60 is conveyed through the nip between the driving roller 15 and the driven roller 25, the driven roller 25 moves in a direction away from the driving roller 15 according to the thickness of the original 60 due to the force generated by conveyance of the original 60 with the rotation of the driving roller 15. That is, the driven roller unit 20 moves in a direction toward the frame 5 with sliding of the sliding guide unit 31 of the driven roller unit 20 against the bearing boss 40. In this case, the protrusion 41, which is formed on the bearing boss 40 and is inserted into the groove 32 of the sliding guide unit 31, moves within the groove 32 along the groove 32.

Since the groove 32 extends in the direction perpendicular to the rotation axis 26, movement of the protrusion 41 within the groove 32 along the groove 32 allows the sliding guide unit 31 to move toward the frame 5 without causing the sliding guide unit 31 and the bearing boss 40 to relatively move in the axial direction of the cylindrically-shaped sliding guide unit 31. In this manner, the protrusion 41 and the groove 32 are formed as a guide structure to guide the sliding guide unit 31 to slide against the bearing boss 40 and regulate the relative rotation of the sliding guide unit 31 and the bearing boss 40 about an axis in the sliding direction.

In this case, the vicinity of the end of the rotation axis 26 enters the guide groove 51 of the axial-end guide unit 50, so that the movement of the rotation axis 26 in the groove width direction of the guide groove 51 is regulated. With this, the relative rotation of the sliding guide unit 31 and the bearing boss 40 in the axial direction of the sliding guide unit 31 is further regulated. Therefore, when the original 60 is conveyed through the nip between the driving roller 15 and the driven roller 25, the driven roller 25 is separated from the driving roller 15 by the thickness of the original 60 due to the movement of the driven roller unit 20 toward the frame 5.

Although the driven roller 25 moves in a direction away from the driving roller 15, the roller spring 38 applies a biasing force to the driven roller unit 20 having the driven roller 25 in a direction away from the frame 5. Therefore, this biasing force is applied to the original 60 as a force for pressing the original 60 via the driven roller 25 that is in contact with the original 60. The driven roller 25 is formed as a pressing roller that applies a pressing force (or a second pressing force) to the original 60 while rotating along with the movement of the original 60 being conveyed. Since the original 60 is pressed against the driving roller 15 due to the pressing force applied by the driven roller 25 serving as the pressing roller, the rotation of the driving roller 15 is efficiently transmitted to the original 60 and the original 60 is thereby conveyed in the conveyance direction.

When the original reaches the image reader unit 10 from the nip between the driving roller 15 and the driven roller 25 on the upstream side in the conveyance direction of the original 60, the original 60 comes into contact with the image reader unit 10. The reader spring 11 applies a biasing force to the image reader unit 10 in a direction away from the frame 5 similarly to the driven roller unit 20. When the original 60 reaches the image reader unit 10 to which the biasing force is applied as above, the image reader unit 10 moves in a direction toward the frame 5 by the thickness of the original 60 similarly to the driven roller unit 20.

Even when the image reader unit 10 moves in the direction toward the frame 5 as above, because the biasing force is applied to the image reader unit 10 by the reader spring 11, the image reader unit 10 is pressed against the original 60 by the biasing force. Therefore, the image reader unit 10 applies a pressing force (or a first pressing force) to the original 60 similarly to the driven roller 25.

The image reader unit 10 applies the pressing force to the original 60 as above. A surface of the image reader unit 10 facing the original 60 is an image read surface for reading an image on the original 60. Therefore, a surface of the original 60, into which the image reader unit 10 comes in contact and to which the pressing force is applied, is a read-target surface from which the image is read. Namely, the image reader unit 10 applies the pressing force to the read-target surface of the original 60 due to the biasing force of the reader spring 11, and the image reader unit 10 and the original 60 are in close contact with each other. When the image on the original 60 is to be read, the image reader unit 10 reads the image while the image reader unit 10 and the read-target surface of the original 60 are in close contact with each other.

The original 60 from which the image has been read by the image reader unit 10 as above is further conveyed toward the downstream side of the conveyance direction of the original 60. On the downstream side of the image reader unit 10 in the conveyance direction, the driving roller 15 and the driven roller 25 are disposed similarly to those on the upstream side of the image reader unit 10. Therefore, the original 60 conveyed to this position is further conveyed to the downstream side by the rotation of the driving roller 15 with application of the pressing force to the original 60 by the driven roller 25.

Since the driving rollers 15 and the driven rollers 25 are disposed on the upstream and downstream sides of the image reader unit 10 in the conveyance direction of the original 60, when the image on the original 60 is to be read, the image reader unit 10 reads an image while stably conveying the original 60. Further, since the driven roller 25 is movable in the pressing direction relative to the frame 5 and independent of the image reader unit 10 and applies the pressing force to the original 60 independent of the image reader unit 10, the pressing force is applied to the original 60 regardless of the state of the image reader unit 10, and the original 60 is thereby stably conveyed.

As described above, the original 60 is conveyed by the rotation of the driving roller 15, and, when the original 60 moves away from the nip between the driving roller 15 and the driven roller 25 or the image read surface side of the image reader unit 10, the driven roller 25 or the image reader unit 10 is moved again in a direction away from the frame 5 due to the biasing force of the roller spring 38 or the reader spring 11.

The sliding guide unit 31 of the driven roller unit 20 having the driven roller 25 moves in a direction away from the bearing boss 40 while the protrusion 41 of the bearing boss 40 is inserted into the groove 32. Since the block portion 33 is formed on the groove 32, when the sliding guide unit 31 moves to a predetermined position with respect to the bearing boss 40, the protrusion 41 abuts against the block portion 33. Therefore, the sliding of the sliding guide unit 31 against the bearing boss 40, which occurs in a direction in which the sliding guide unit 31 and the bearing boss 40 are separated from each other due to the biasing force of the roller spring 38, is regulated by the block portion 33 of the groove 32 and the protrusion 41. Accordingly, the movement of the driven roller unit 20 in a direction away from the frame 5 is stopped. When the sliding guide unit 31 slides against the bearing boss 40 in a direction in which the bearing unit 30 and the bearing boss 40 are separated from each other, the groove 32 and the protrusion 41 function as a regulation structure, in addition to the guide structure, for regulating the sliding in the separating direction by causing the protrusion 41 and the block portion 33 come into contact with each other.

In the image reading apparatus 1 as described above, when the image reader unit 10 is moved relative to the frame 5 and the pressing force is applied to the original 60 by bringing the image reader unit 10 into close contact with the original 60 for reading an image, the driven roller 25 moves relative to the frame 5 and independent of the image reader unit 10 and applies the pressing force to the original 60 independent of the image reader unit 10. Therefore, even when the diameter of the driven roller 25 is reduced in order to downsize the entire image reading apparatus 1, it is possible to ensure the stroke of the driven roller 25 for applying the pressing force to the original 60. Consequently, even when the driven roller 25 applies the pressing force to the original 60 while the original 60 is being conveyed at the time of reading the original 60, the pressing force can be appropriately applied to the original 60. Therefore, the original 60 can be reliably conveyed. As a result, it is possible to stably convey the original 60 while allowing for downsizing of the apparatus.

The bearing boss 40 for supporting the sliding guide unit 31 of the bearing unit 30 that supports the rotation axis 26 of the driven roller 25 is arranged on the frame 5, and the bearing boss 40 slidably supports the sliding guide unit 31 while the biasing force in the pressing direction toward the original 60 is applied to the sliding guide unit 31. Therefore, it is possible to move the driven roller 25 independent of the image reader unit 10, so that the stroke of the driven roller 25 can be ensured. Consequently, it is possible to reliably apply an appropriate pressing force to the original 60 when the original 60 is conveyed. As a result, it is possible to more reliably and stably convey the original 60 while allowing for downsizing of the apparatus.

The roller spring 38, which is the elastic member for applying the biasing force to the sliding guide unit 31 and the bearing boss 40 in the pressing direction toward the original 60, is disposed between the sliding guide unit 31 and the bearing boss 40. Therefore, the driven roller 25 can reliably apply an appropriate pressing force to the original 60 with the aid of the elastic force of the roller spring 38. As a result, it is possible to more reliably and stably convey the original 60 while allowing for downsizing of the apparatus.

The grooves 32 and the protrusions 41, which serve as the guide structure for guiding the sliding of the sliding guide unit 31 against the bearing boss 40 and regulating relative rotation of the sliding guide unit 31 and the bearing boss 40 about an axis in the sliding direction, are arranged on the sliding guide unit 31 and the bearing boss 40, respectively. Therefore, the bearing boss 40 can appropriately support the sliding guide unit 31, and the driven roller 25 can apply a pressing force to the original 60 in an appropriate direction. As a result, it is possible to more reliably and stably convey the original 60 while allowing for downsizing of the apparatus.

The guide structure includes the groove 32, which is formed in the sliding direction of the sliding guide unit 31, and the protrusion 41, which is inserted into the groove 32. Therefore, the driven roller 25 can more reliably apply a pressing force to the original 60 in an appropriate direction. As a result, it is possible to more reliably and stably convey the original 60 while allowing for downsizing of the apparatus.

The groove 32 formed on the sliding guide unit 31 includes the block portion 33 that is a blocked end formed on the bearing boss 40 side. The groove 32 and the protrusion 41 also serve as the regulation structure for regulating the sliding of the sliding guide unit 31 against the bearing boss 40 in a direction in which the sliding guide unit 31 and the bearing boss 40 are separated from each other. Therefore, it is possible to make the sliding guide unit 31 slidable against the bearing boss 40 in the appropriate range without additionally providing a structure for regulating the sliding in the above direction. Consequently, it is possible to simplify the structure for appropriately applying the pressing force to the original 60 by the driven roller 25, so that the structure can be downsized. As a result, it is possible to more reliably and stably convey the original 60 while allowing for downsizing of the apparatus.

The axial-end guide unit 50 having the guide groove 51 is arranged on the frame 5 so as to support the vicinity of the rotation axis 26 such that the rotation axis 26 can move in the pressing direction toward the original 60 while the guide groove 51 regulates the movement of the rotation axis 26 in the direction perpendicular to the pressing direction. Therefore, when the driven roller 25 presses the pressing force to the original 60, it is possible to suppress the movement of the driven roller 25 in a direction other than the direction in which the pressing force is applied, so that the pressing force can be applied in the appropriate direction. As a result, it is possible to more reliably and stably convey the original 60 while allowing for downsizing of the apparatus.

The driven roller unit 20 includes the plurality of the driven rollers 25 so that the rotation axes 26 are oriented in the same direction. Therefore, when the driven rollers 25 apply the pressing force to the original 60, the pressing force can be applied with good balance. The plurality of the driven roller units 20 are provided so that the lengths of the rotation axes 26 can be shortened. Therefore, it is possible to suppress flexure of the driven rollers 25, and suppress the reduction of the pressing force to the original 60 caused by the flexure of the rotation axis 26. As a result, it is possible to more reliably and stably convey the original 60.

Figure 11:
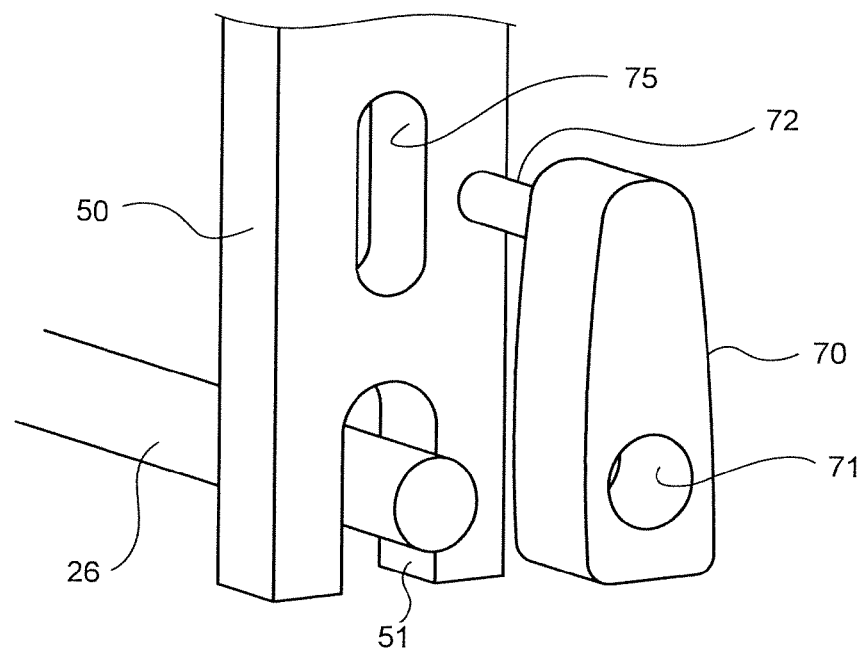
FIG. 11 is an explanatory diagram of a modification of the image reading apparatus according to the embodiment.
Figure 12:
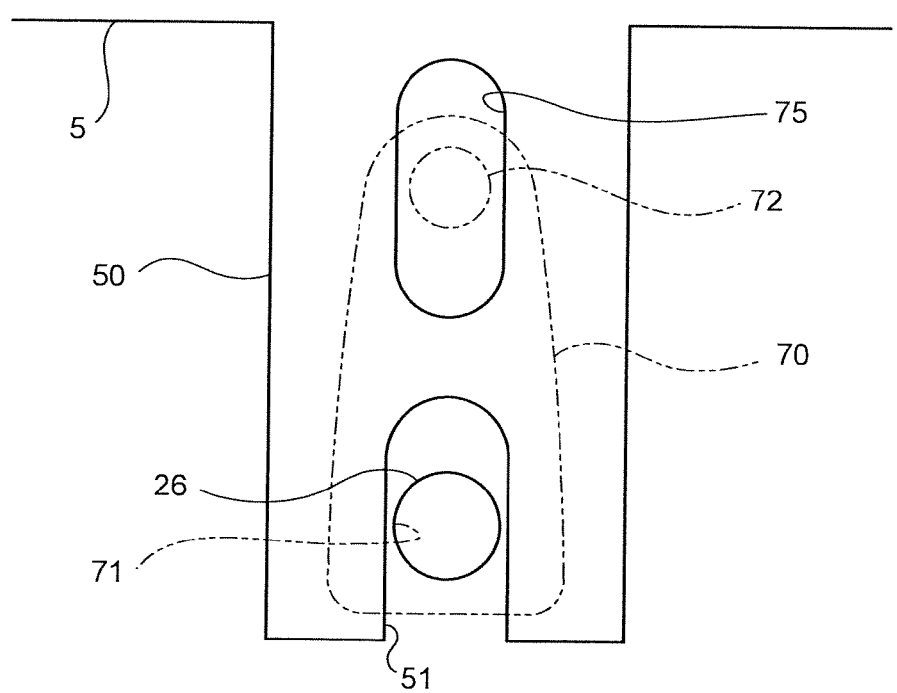
FIG. 12 is an explanatory diagram of the modification of the image reading apparatus according to the embodiment.

FIGS. 11 and 12 are explanatory diagrams of a modification of the image reading apparatus according to the embodiment. In the image reading apparatus 1 of the above embodiment, the axial-end guide unit 50 supports the rotation axis 26 that has entered the guide groove 51 having one open end. However, it is possible to arrange a stopper structure on the axial-end guide unit 50 for preventing the rotation axis 26 from coming off. For example, as depicted in FIGS. 11 and 12, it is possible to form a detachably attachable stopper 70 as a stopper member on the end of the rotation axis 26. The stopper 70 in this example is in the form of a plate having an axial-end support hole 71 formed thereon, which is a hole into which the rotation axis 26 is inserted. A regulation shaft 72 as a shaft that protrudes in a direction parallel to the axial direction of the axial-end support hole 71 is formed on one surface of the plate.

A regulation groove 75 as a stopper portion, with which the regulation shaft 72 of the stopper 70 can be engaged, is formed in a predetermined range in the pressing direction of the pressing force applied to the original 60 by the driven roller 25. The regulation groove 75 is a groove that has a groove width wider than the diameter of the regulation shaft 72, and extends in the pressing direction of the pressing force applied to the original 60 by the driven roller 25.

For supporting the vicinity of the end of the rotation axis 26 by the axial-end guide units 50, the regulation shaft 72 of the stopper 70 is inserted into the regulation groove 75 of the axial-end guide unit 50 while the rotation axis 26 is inserted into the guide groove 51, and then the rotation axis 26 is inserted into the axial-end support hole 71 of the stopper 70. Accordingly, when the driven roller 25 moves in the pressing direction toward the original 60 by the thickness or the like of the original 60 at the time of reading the image on the original 60, the regulation shaft 72 of the stopper 70 moves along the regulation groove 75 of the axial-end guide unit 50. Therefore, the rotation axis 26 of the driven roller 25 can move without being regulated by the stopper 70.

By moving the driven roller unit 20 in a direction away from the frame 5, moving the rotation axis 26 to the vicinity of the end on the opening side of the guide groove 51, and bringing the regulation shaft 72 of the stopper 70 into contact with the end of the regulation groove 75 of the axial-end guide unit 50, further movement is regulated. Accordingly, the rotation axis 26 is prevented from coming off from the guide groove 51. Thus, by forming the detachably attachable stopper 70 on the end of the rotation axis 26 and forming the regulation groove 75 on the axial-end guide unit 50, it is possible to regulate the movement of the rotation axis 26 in the pressing direction within the predetermined range and support the rotation axis 26 by the axial-end guide unit 50 while preventing the rotation axis 26 from coming off from the axial-end guide units 50. As a result, it is possible to more reliably and stably convey the original 60.

When the stopper 70 as above is provided, the stopper 70 may be used as a rotation stopper for stopping rotation of the rotation axis 26. The stopper 70 described above has the axial-end support hole 71, which is a hole in the form of a circle, and the end of the rotation axis 26 is also in the form of a circle. However, the cross section of the portion of the rotation axis 26 that is inserted into the axial-end support hole 71 may be in the form of, for example, a semicircle, and the axial-end support hole 71 may be in the form of a semicircle that can be engaged with the semicircle of the rotation axis 26. Accordingly, when the rotation axis 26 is inserted into the axial-end support hole 71 and the stopper 70 is attached to the axial-end guide units 50, the rotation of the rotation axis 26 can be stopped.

Therefore, in the driven roller unit 20 having a structure in which the rotation axis 26 is stopped and the driven roller 25 rotates relative to the rotation axis 26, the stopper 70 may be used as the rotation stopper for the rotation axis 26 by forming the engaged state between the end of the rotation axis 26 and the axial-end support hole 71, which are in the shapes other than the circles. As described above, by using the stopper 70 as the rotation stopper for the rotation axis 26, it is not necessary to additionally provide a structure for stopping the rotation axis 26 when the driven roller unit 20 is structured such that the rotation axis 26 is not rotated. Therefore, it is possible to simplify the structure and more reliably downsize the apparatus.

In the image reading apparatus 1 according to the embodiment, the groove 32 and the protrusion 41, which serve as the guide structure, are formed such that the groove 32 is formed on the sliding guide unit 31 and the protrusion 41 is formed on the bearing boss 40. However, the members on the groove 32 and the protrusion 41 may be replaced with each other. It is sufficient that the groove 32 is formed on one of the sliding guide unit 31 and the bearing boss 40, and the protrusion 41 is formed on the other one of the sliding guide unit 31 and the bearing boss 40. The guide structure for guiding the sliding of the bearing unit 30 against the bearing boss 40 and regulating the relative rotation of the bearing unit 30 and the bearing boss 40 about an axis in the sliding direction may be formed of units other than the groove 32 and the protrusion 41.

According to the embodiments, when an image reading unit is moved relative to a frame and an image is read while a pressing force is applied to a to-be-read-medium, a pressing roller is moved relative to the frame and independent of the image reading unit so that the pressing force can be applied to the to-be-read-medium independent of the image reading unit. Therefore, even when the diameter of the pressing roller is reduced in order to downsize the entire image reading apparatus, it is possible to ensure the stroke of the pressing roller for applying the pressing force to the to-be-read-medium. Consequently, even when the to-be-read-medium is conveyed while the pressing force is applied by the pressing roller at the time of reading an image on the to-be-read-medium, the pressing force can be appropriately applied to the to-be-read-medium, so that the to-be-read-medium can be reliably conveyed. As a result, it is possible to stably convey the to-be-read-medium while allowing for downsizing of the apparatus.

According to the embodiments, a roller supporting unit for supporting a bearing unit that supports a rotation axis of the pressing roller is arranged on the frame. The roller supporting unit slidably supports the bearing unit while the biasing force in the pressing direction toward the to-be-read-medium is applied to the bearing unit. Therefore, it is possible to more reliably move the pressing roller independent of the image reading unit, so that the stroke of the pressing roller can be ensured. Consequently, it is possible to more reliably apply an appropriate pressing force to the to-be-read-medium when the to-be-read-medium is conveyed. As a result, it is possible to more reliably and stably convey the to-be-read-medium while allowing for downsizing of the apparatus.

According to the embodiments, an elastic member is disposed between the bearing unit and the roller supporting unit. Due to the elastic force of the elastic member, the pressing roller can reliably apply an appropriate pressing force to the to-be-read-medium. Therefore, it is possible to more reliably and stably convey the to-be-read-medium while allowing for downsizing of the apparatus.

According to the embodiments, a guide structure is formed on the bearing unit and the roller supporting unit. Therefore, the roller supporting unit can appropriately support the bearing unit, and the pressing roller can apply the pressing force to the to-be-read-medium in an appropriate direction. As a result, it is possible to more reliably and stably convey the to-be-read-medium while allowing for downsizing of the apparatus.

According to the embodiments, the guide structure includes a groove that is formed on the bearing unit in the sliding direction and a protrusion that is insertable into the groove. The groove and the protrusion are separately arranged on the bearing unit and the roller supporting unit, respectively. Therefore, when the pressing roller applies the pressing force to the to-be-read-medium, the pressing force can be more reliably applied in an appropriate direction. As a result, it is possible to more reliably and stably convey the to-be-read-medium while allowing for downsizing of the apparatus.

According to the embodiments, an end of the groove is blocked. With this, the guide structure also serves as a regulation structure for regulating the sliding of the bearing unit against the roller supporting unit in a direction in which the bearing unit and the roller supporting unit are separated from each other. Therefore, the bearing unit can be made slidable against the roller supporting unit in the appropriate range without additionally providing a structure for regulating the sliding. Consequently, the structure for appropriately applying the pressing force to the to-be-read-medium by the pressing roller can be simplified, leading to downsizing of the apparatus. As a result, it is possible to stably convey the to-be-read-medium while allowing for downsizing of the apparatus.

According to the embodiments, an axial-end guide having a guide groove is arranged on the frame so as to regulate the vicinity of an end of the rotation axis. Therefore, when the pressing roller applies the pressing force to the to-be-read-medium, it is possible to regulate the movement of the pressing roller in a direction other than the direction in which the pressing force is applied. Consequently, the pressing force can be applied in an appropriate direction. As a result, it is possible to more reliably and stably convey the to-be-read-medium while allowing for downsizing of the apparatus.

According to the embodiments, by detachably attaching a stopper member to the end of the rotation axis and forming a stopper portion on the axial-end guide, it is possible to regulate the movement of the rotation axis in the pressing direction within a predetermined range. Therefore, it is possible to support the rotation axis by the axial-end guide while preventing the rotation axis from coming off from the axial-end guide. As a result, it is possible to more reliably and stably convey the to-be-read-medium.

The image reading apparatus according to the present invention can downsize the apparatus and stably convey to-be-read-media.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reading apparatus comprising:
an image reader that has a plurality of light receiving elements for reading an image on a to-be-read-medium, and moves relative to a frame for applying a first pressing force to a read-target surface of the to-be-read-medium, the read-target surface carrying an image to be read; and
a pressing roller that is rotatable, comes into contact with the to-be-read-medium, and moves relative to the frame and independent of the image reader in the same direction in which the image reader applies the first pressing force to the to-be-read-medium, thereby applying a second pressing force to the to-be-read-medium independent of the image reader, wherein
the frame includes a roller supporter that supports a bearing that supports a rotation axis of the pressing roller,
the pressing roller applies the second pressing force to the to-be-read-medium when the roller supporter slidably supports the bearing while the bearing is applied with a biasing force in a pressing direction in which the pressing roller applies the second pressing force to the to-be-read-medium, and
the image reading apparatus further comprises an elastic member that is disposed between the bearing and the roller supporter for applying a biasing force in the pressing direction to the bearing and the roller supporter.

2. An image reading apparatus comprising:
an image reader that has a plurality of light receiving elements for reading an image on a to-be-read-medium, and moves relative to a frame for applying a first pressing force to a read-target surface of the to-be-read-medium, the read-target surface carrying an image to be read: and
a pressing roller that is rotatable, comes into contact with the to-be-read-medium, and moves relative to the frame and independent of the image reader in the same direction in which the image reader applies the first pressing force to the to-be-read-medium, thereby applying a second pressing force to the to-be-read-medium independent of the image reader, wherein
the frame includes a roller supporter that supports a bearing that supports a rotation axis of the pressing roller,
the pressing roller applies the second pressing force to the to-be-read-medium when the roller supporter slidably supports the bearing while the bearing is applied with a biasing force in a pressing direction in which the pressing roller applies the second pressing force to the to-be-read-medium, and
the image reading apparatus further comprises a guide structure for guiding sliding of the bearing against the roller supporter and regulating relative rotation of the bearing and the roller supporter about an axis in a sliding direction of the sliding, the guide structure being formed on the bearing and the roller supporter.

3. The image reading apparatus according to claim 2, wherein
the guide structure includes a groove formed in the sliding direction and a protrusion that enters the groove, wherein
the groove is formed on one of the bearing and the roller supporter, and
the protrusion is formed on the other one of the bearing and the roller supporter.

4. The image reading apparatus according to claim 3, wherein
an end of the groove on the side facing one of the bearing and the roller supporter, the one on which the protrusion is formed, is blocked, and
when the bearing slides against the roller supporter in a direction in which the bearing is separated from the roller supporter, the guide structure serves as a regulation structure for regulating the sliding by causing the protrusion to come into contact with the blocked end of the groove.

5. An image reading apparatus comprising:
an image reader that has a plurality of light receiving elements for reading an image on a to-be-read-medium, and moves relative to a frame for applying a first pressing force to a read-target surface of the to-be-read-medium, the read-target surface carrying an image to be read; and a pressing roller that is rotatable, comes into contact with the to-be-read-medium, and moves relative to the frame and independent of the image reader in the same direction in which the image reader applies the first pressing force to the to-be-read-medium, thereby applying a second pressing force to the to-be-read-medium independent of the image reader, wherein the frame includes a roller supporter that supports a bearing that supports a rotation axis of the pressing roller, the pressing roller applies the second pressing force to the to-be-read-medium when the roller supporter slidably supports the bearing while the bearing is applied with a biasing force in a pressing direction in which the pressing roller applies the second pressing force to the to-be-read-medium, and the image reading apparatus further comprises the frame includes an axial-end guide that has a guide groove into which an end of the rotation axis is inserted, and which supports the rotation axis so as to allow movement of the rotation axis in the pressing direction and regulate movement of the rotation axis in a direction perpendicular to the pressing direction.

6. The image reading apparatus according to claim 5, further comprising:

a stopper member that is detachably attached to an end of the rotation axis, wherein the axial-end guide has a stopper portion with which the stopper member is movably engaged within a predetermined range in the pressing direction.

* * * * *